Sept. 15, 1931.  A. T. BACON  1,823,639
LOCOMOTIVE VALVE GEAR
Filed Aug. 22, 1924  3 Sheets-Sheet 2

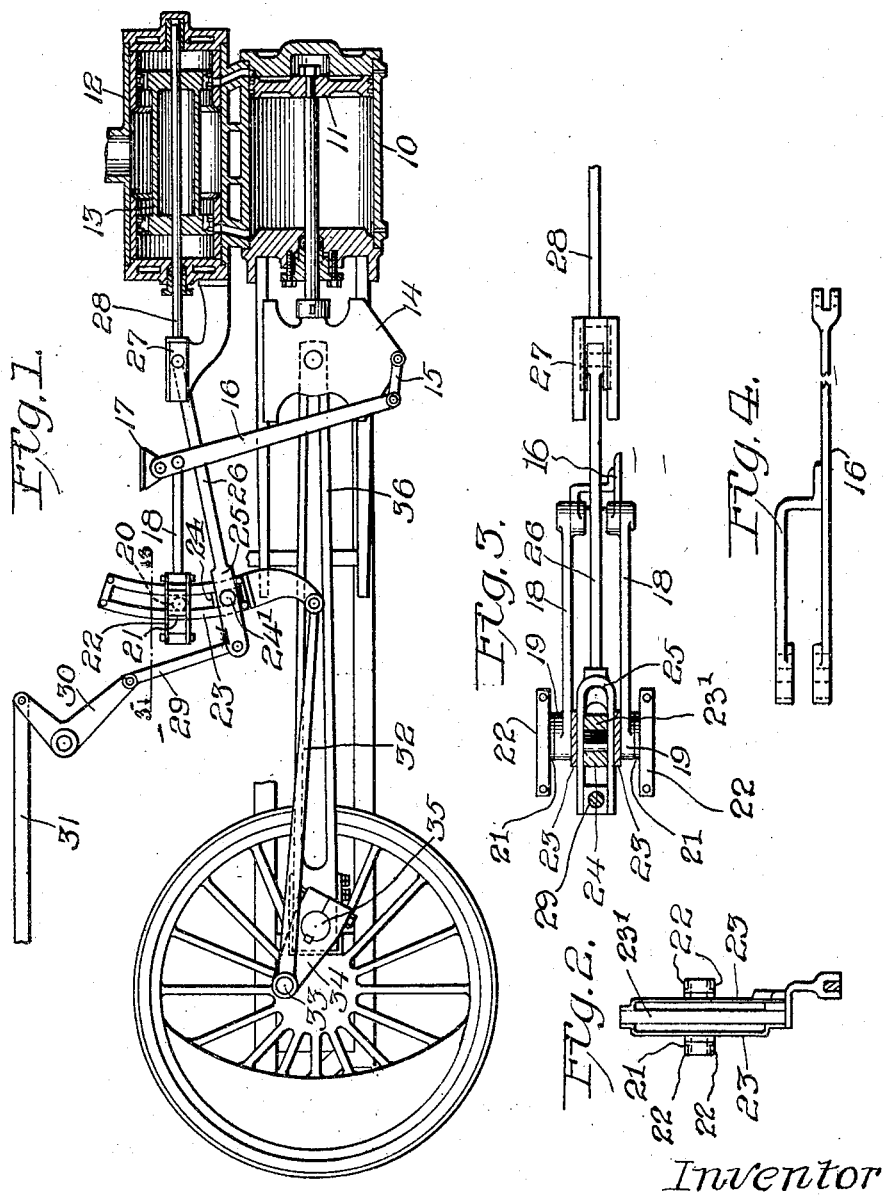

Inventor:
Alfred T. Bacon
by George Bayard Jones
Atty.

Sept. 15, 1931.   A. T. BACON   1,823,639
LOCOMOTIVE VALVE GEAR
Filed Aug. 22, 1924   3 Sheets-Sheet 3

Inventor:
Alfred T. Bacon

Patented Sept. 15, 1931

1,823,639

UNITED STATES PATENT OFFICE

ALFRED T. BACON, OF STEVENS POINT, WISCONSIN

LOCOMOTIVE VALVE GEAR

Application filed August 22, 1924. Serial No. 733,455.

My invention relates to improvements in locomotive valve gears.

The object of the invention is to provide an improved valve gear of the type wherein the valve derives part of its motion from an eccentric and part from the motion of the crosshead, such valve gears as used heretofore being known as the "Walschaert" type.

The Stevenson link is regarded as the ideal valve gear for locomotives as well as for stationary engines, but due to the inaccessibility of the parts, the Walschaert gear and other special gears have been developed for use on the outside of the wheels. With the Walschaert gear it is impractical to have two eccentrics, and therefore the slotted link simply rocks back and forth about a fixed middle position whereas with the Stevenson link, not only do the ends move back and forth, but the middle part reciprocates to a certain extent.

Another object of my invention is to obtain the benefits of the Stevenson link with an outside valve gear arrangement and I accomplish this by my mechanism, which gives a back and forth or reciprocating movement to the center of the link.

With the Walschaert gear, it has been the practice at times in the past to attempt to improve the operation of the locomotive by changing certain parts including the lap and lead lever so that when the engine is on dead center, for example, the movement of the reverse lever will give a variable lead, i. e. the valve will slide a little and thus show different leads for different positions of the reverse lever. Beginning from the end of the throw of the reverse lever or "corner" as said lever is moved toward the middle, the lead increases. This is referred to as the variable lead which has been sought heretofore by making the changes referred to.

More specifically the object of the present invention is to provide a valve gear in which the valve opens the admission and exhaust ports more rapidly than with other types of locomotive valve gears so as to give a considerable pre-admission as well as a pre-release, which action is advantageous at high speeds; also the pre-admission and pre-release are variable, that is, as the locomotive travels faster and as the link block is moved nearer to the center, the preadmission becomes greater.

The prior practice has been to cut off the steam before the end of the stroke and rely on the final movement of the piston to compress the steam up to a point where it would equal the boiler pressure and thus afford a smooth curve, but in practice there is always a certain amount of leakage as it is impossible to keep the valves tight, and as a result, this compression is not built up as it should be and the advantage of compression at high speed is lost. With my arrangement the valve cuts off and compresses the steam, as has been done before, and in addition admits live steam to this compressed steam so that should the latter not compress as high as desired, the live steam supplements this lack and a high compression is built up which becomes increasingly higher as the speed becomes greater, due to the moving of the link toward mid-position. This increases the efficiency of the locomotive and also the cushioning effect and in addition eliminates pounding, as all the parts come to rest without any lost motion, the lost motion being taken up as the cushioning begins, whereas in present practice this is not the case, due to the leakage of steam during compression.

In the accompanying drawings I have illustrated one embodiment of my invention, in which Fig. 1 is a side elevation, partly in section, of the link mechanism and certain associated parts;

Fig. 2 is a rear elevation of the slotted link and supporting structure;

Fig. 3 is a top plan view, partly in section on the line 3—3 of certain parts shown in Fig. 1;

Fig. 4 is an enlarged elevation of the lap and lead lever;

Figure 7:
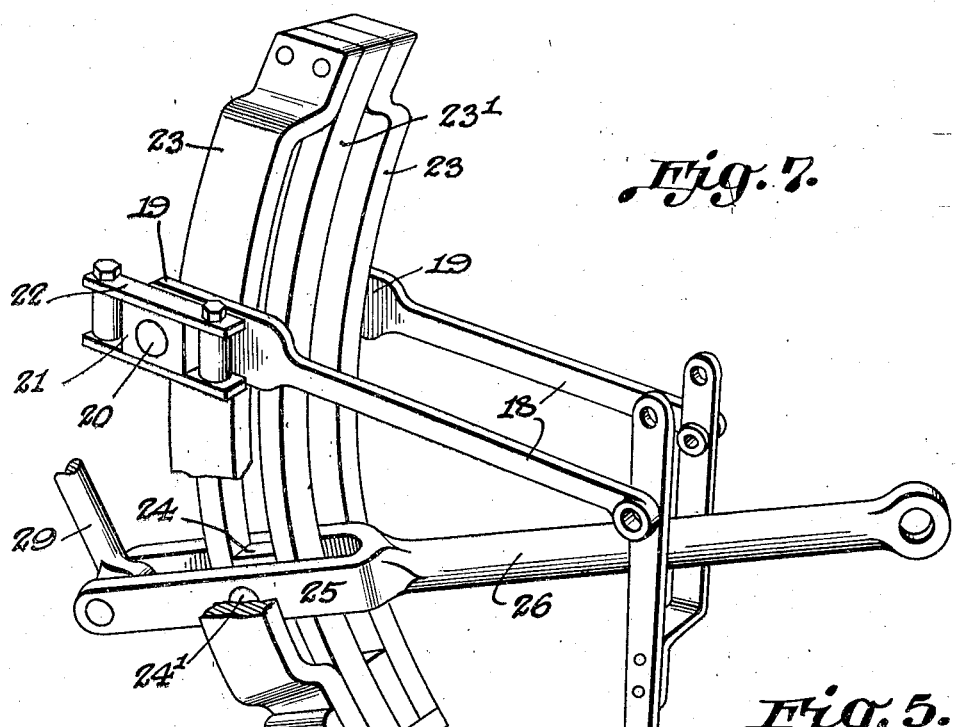
Fig. 7 is an enlarged perspective view thereof.

Figs. 9 to 12 inclusive are similar diagrams showing the driving wheel rotated through successive 45° angles.

The equipment comprises the usual cylinder 10 and a piston 11 with a steam chest 12 and piston valve 13. The cross-head 14 has a short union link 15 which oscillates the lower end of the lap and lead lever 16 which is pivoted at its upper end to a fixed bracket 17. A pair of horizontal rods 18 are each connected at one end near the upper end of the lever 16 (which is bifurcated at the upper end, as shown in Fig. 4), and at the other ends are enlarged to provide heads 19 having openings therein through which pins 20 pass. Each pin is supported at its outer end in a sliding block 21 which reciprocates between upper and lower guides 22, the latter being secured to part of the locomotive frame, not shown. The inner end of each pin is received in an opening in one of the two link brackets 23. These brackets, as shown in Fig. 2, are secured at the top and bottom thereof to the slotted link 23′, but are otherwise spaced therefrom to provide a clearance. In Fig. 1 these link brackets are omitted to show the slotted link more clearly. A link block 24 is arranged to slide up and down in the slot in the link 23′ and has a pin 24′ passing through it and mounted in the bifurcated end 25 of the radius rod 26. The two arms of the U shaped end 25 slide up and down in the clearance space between the link brackets 23 and the link 23′, from top to bottom.

With the arrangement described the central part of the slotted link may be reciprocated back and forth in the guide frame 22 about 2 inches, this travel representing the lap plus the lead.

The other end of the radius rod 26 is connected to the cross-head 27 and thereby reciprocates the valve rod 28. The yoke end of the radius rod is connected to a link 29 or radius rod hanger, which in turn is actuated by a bell-crank lever 30 and reach rod 31 extending into the locomotive cab whereby the valve motion may be shortened or reversed. The effect of the foregoing arrangement is that the arc shaped slotted link is pivotally supported about the pins 20, although it is free to travel back and forth about two inches. These pins are preferably on a line with the valve rod. The curved lower end of said slotted link is pivotally connected to an eccentric rod 32, the other end of which is pivotally mounted on a pin 33 on the end of a short eccentric arm 34, which latter is mounted on the main pin 35 which also carries the connecting rod 36.

It will be noted that the pin 33 is mounted a little less than 90° from the main pin 35, the difference constituting the angular advance. With this arrangement, and with the parts in the position shown in the drawings, i. e., on dead center, the main axis of the slotted link is substantially vertical. In other words said axis is vertical at either end of the stroke, when the connecting rod is on dead center.

Figure 5:
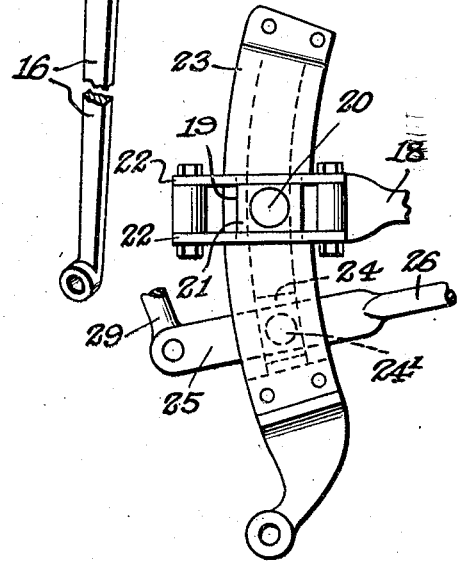
Fig. 5 is an enlarged side elevation of the slotted link and associated parts.
Figure 6:
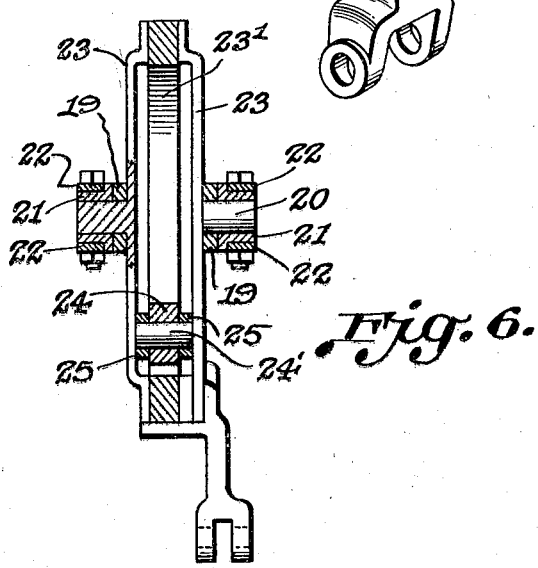
Fig. 6 is a central vertical section thereof.
Figure 8:
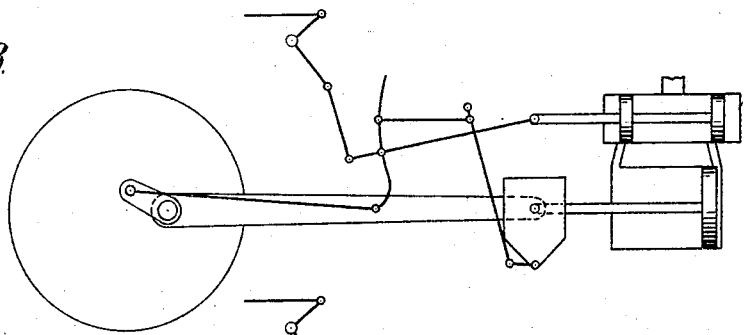
Fig. 8 is a diagram of the valve gear mechanism showing the connecting rod on dead center corresponding to Fig. 1.
Figure 9:
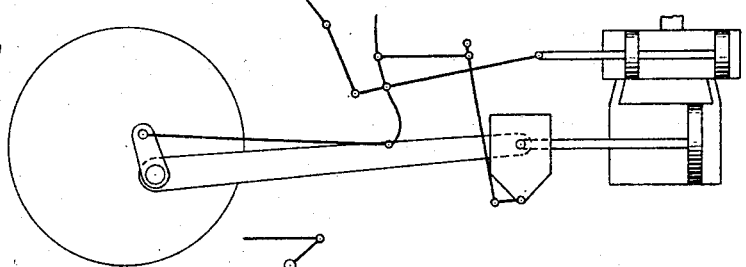
Figure 10:
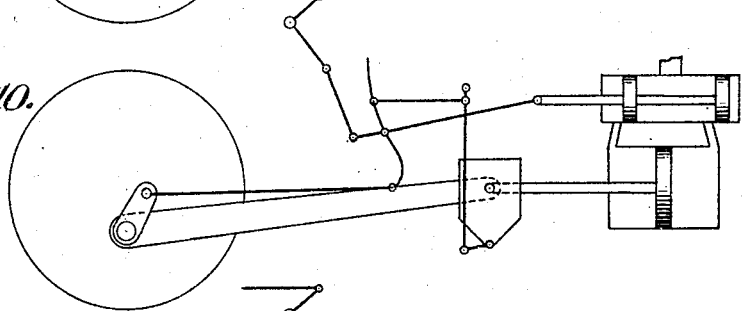
Figure 11:
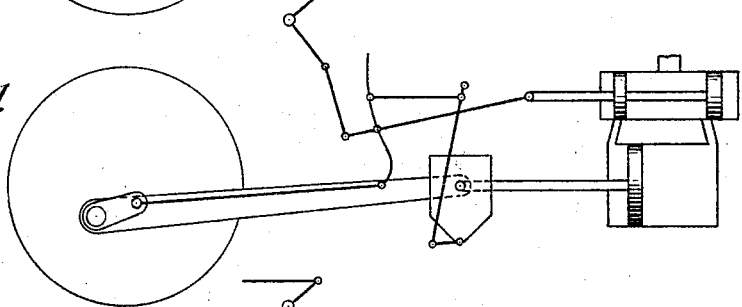
Figure 12:
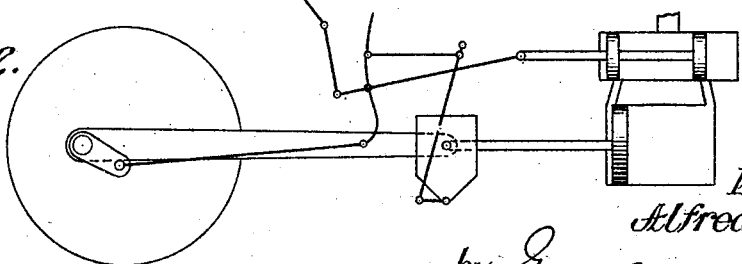

Figs. 5 to 9, inclusive, illustrate, diagrammatically, the relative positions of the piston, piston rod and valve gear mechanism during a half rotation of the driving wheel, the drawings showing 45° positions beginning with Fig. 5, which is the position corresponding to Fig. 1 of the drawings.

The operation of the valve gear is substantially as follows: The eccentric oscillates the slotted link about its pivotal support, and at the same time said pivotal support is reciprocated by the lap and lead lever. The motion imparted to the valve is therefore the resultant of these two movements, the eccentric movement, however, being the predominating one at full stroke of the valve, or full gear position; in other words, in the position shown, in which the block is at the lower end of the slotted link. This is the position in which the locomotive is started, and as it speeds up the block is moved nearer to the center of the slotted link. As a result the valve motion is influenced more and more by the crosshead movement, and correspondingly less by the eccentric, and the cutoff is shortened. The effect of this resultant movement is that the admission and the exhaust are advanced. In fact, all the operations of admission, cutoff, release and compression are advanced, since they correspond to the movement of the cross-head which is nearly a quarter turn in advance of the eccentric pin 33.

By pre-admission is meant admission of steam before the end of the stroke of the piston, at which time the compression is built up but not as high as the boiler pressure. The preadmission is variable as shown by sliding the link block from its extreme upper or lower position to middle position with the main pin 35 on the forward top eighth postion i. e. 22½° back or above the position in which it is shown in Figs. 1 and 5. Preadmission takes place at different points of the stroke, depending on the speed. At the bottom position and on dead center, as shown in Fig. 1, there is a definite but slight valve opening which becomes greater as the link block is moved toward the center by moving the reverse lever.

With the locomotive running at high speed, and with a light train, the link may, under some conditions, be moved to the middle of the link block, which is the shortest cutoff at which the locomotive can operate. In this position the valve motion corresponds entirely to the cross-head motion and the movement of the valve is merely the lap plus the lead, which is the minimum movement.

As distinguished from the variable lead of the prior art previously referred to, my valve mechanism causes the lead to remain the same for different positions of the reverse lever. With my design, by moving the reverse lever from the corner to the middle position with the wheel back a few degrees from the position shown in Fig. 1 of the drawings, admission occurs before the end of the stroke and the resulting compression increases as the lever is swung to middle position and this variable pre-admission means that as the engine runs faster, more live steam is admitted to the clearance space between the piston and the end toward which it is moving to build up the compression. This valve gear not only gives pre-admission but pre-release, pre-cut-off and pre-compression.

There is an advantage in the earlier release at high speed particularly as it enables the steam to discharge quickly. The pre-cut-off and pre-compression are incidental to the adjustment necessary to give pre-admission, but pre-compression at high speeds is an advantage as it results in a high compression to which is added the advantage of pre-admission.

What I claim is:

In a device of the class described, a piston, piston rod, cross-head, crank and driving wheel driven thereby, an eccentric rod associated with said driving wheel, a slotted link connected thereto and having a pivotal support, means forming guides for said pivotal support whereby it may reciprocate, a lap and lead lever having a fixed pivot at one end and connected to the cross-head at the other end, a link connecting the pivotal support for said slotted link to a point on said lever between its ends, a block arranged to slide in the slot in said link, a radius rod extending therefrom, a valve rod, a valve on said rod, and means for moving said block to the neutral position of said slotted link whereby at high running speeds the motion of the valve may correspond entirely to the cross-head motion and equal the lap plus the lead.

In testimony whereof, I have subscribed my name.

ALFRED T. BACON.

CERTIFICATE OF CORRECTION.

Patent No. 1,823,639.            Granted September 15, 1931, to

ALFRED T. BACON.

It is hereby certified that error appears in the printed specification of the above numbered patent requiring correction as follows: Page 3, line 46, in the claim, after the word "ends" insert the phrase to reciprocate said support and link; and that the said Letters Patent should be read with this correction therein that the same may conform to the record of the case in the Patent Office.

Signed and sealed this 3rd day of November, A. D. 1931.

(Seal)

M. J. Moore,
Acting Commissioner of Patents.